United States Patent
Chaut et al.

(10) Patent No.: US 12,545,005 B2
(45) Date of Patent: Feb. 10, 2026

(54) GAS-DUCT WITH A SOUND ABSORBING COMPONENT

(71) Applicant: Zephyros, Inc., Romeo, MI (US)

(72) Inventors: Christophe Chaut, Molsheim (FR); Greg Thompson, Simpsonville, SC (US); Marc Engel, Lingolsheim (FR)

(73) Assignee: Zephyros, Inc., Romeo, MI (US)

( * ) Notice: Subject to any disclaimer, the term of this patent is extended or adjusted under 35 U.S.C. 154(b) by 624 days.

(21) Appl. No.: 17/266,234

(22) PCT Filed: Aug. 6, 2019

(86) PCT No.: PCT/EP2019/071089
§ 371 (c)(1),
(2) Date: Feb. 5, 2021

(87) PCT Pub. No.: WO2020/030626
PCT Pub. Date: Feb. 13, 2020

(65) Prior Publication Data
US 2021/0293449 A1    Sep. 23, 2021

Related U.S. Application Data (60) Provisional application No. 62/714,981, filed on Aug. 6, 2018.

(30) Foreign Application Priority Data

Mar. 27, 2019  (EP) .................................... 19165568

(51) Int. Cl.
*B32B 5/02*      (2006.01)
*B32B 1/08*      (2006.01)
(Continued)

(52) U.S. Cl.
CPC .............. *B32B 5/022* (2013.01); *B32B 1/08* (2013.01); *B32B 5/22* (2013.01); *B32B 7/12* (2013.01);
(Continued)

(58) Field of Classification Search
CPC ........... B32B 5/022; B32B 5/22; B32B 27/12; B32B 27/32; B32B 27/36;
(Continued)

(56) References Cited

U.S. PATENT DOCUMENTS 6,178,764 B1   1/2001  Tanaka et al.
6,971,474 B2   12/2005 Prosser et al.
(Continued)

FOREIGN PATENT DOCUMENTS

CH   706213 A2     9/2013
CN   101163584 A   4/2008
(Continued)

OTHER PUBLICATIONS

Espacenet Translation of FR-2995827-A1 (Year: 2023).*
(Continued)

*Primary Examiner* — Michael Zhang
(74) *Attorney, Agent, or Firm* — The Dobrusin Law Firm, P.C.

(57) ABSTRACT

The present teachings relate generally to a gas-duct whose channel body is manufactured from a plastic material, wherein the channel body has at least one region replaced by a sound absorbing component being made at least partially from at least one non-woven layer. The present invention further relates to a HVAC- and Battery- and/or battery-charge-system and to a method of producing a gas-duct.

20 Claims, 2 Drawing Sheets

(51) Int. Cl.
- *B32B 5/22* (2006.01)
- *B32B 7/12* (2006.01)
- *B32B 27/12* (2006.01)
- *B32B 27/32* (2006.01)
- *B32B 27/36* (2006.01)
- *F24F 13/02* (2006.01)
- *F24F 13/24* (2006.01)

(52) U.S. Cl.
CPC .............. *B32B 27/12* (2013.01); *B32B 27/32* (2013.01); *B32B 27/36* (2013.01); *F24F 13/02* (2013.01); *F24F 13/0245* (2013.01); *F24F 13/24* (2013.01); *B32B 2262/0253* (2013.01); *B32B 2262/0284* (2013.01); *B32B 2262/101* (2013.01); *B32B 2262/105* (2013.01); *B32B 2262/144* (2021.05); *B32B 2307/102* (2013.01); *B32B 2307/304* (2013.01); *B32B 2307/50* (2013.01); *B32B 2605/00* (2013.01); *F24F 2013/242* (2013.01)

(58) Field of Classification Search
CPC ........ B32B 2307/102; B32B 2307/304; B32B 2605/00; B32B 2262/0253; B32B 2262/0284; B32B 2262/144; F24F 13/02; F24F 13/24; F24F 2013/242
See application file for complete search history.

(56) References Cited

U.S. PATENT DOCUMENTS

| | | | |
|---|---|---|---|
| 9,243,543 B2 | 1/2016 | Bertrand et al. | |
| 2005/0020200 A1* | 1/2005 | Prosser | B60H 1/00564 454/143 |
| 2006/0225952 A1* | 10/2006 | Takayasu | G10K 11/162 181/294 |
| 2007/0066208 A1 | 3/2007 | Almori et al. | |
| 2009/0166126 A1* | 7/2009 | Patsouras | B29C 43/18 181/224 |
| 2010/0066121 A1 | 3/2010 | Gross | |
| 2011/0293911 A1 | 12/2011 | Coates et al. | |
| 2013/0316102 A1 | 11/2013 | Yoshida | |
| 2015/0231946 A1 | 8/2015 | Bianchi | |
| 2015/0273739 A1 | 10/2015 | Leuciuc et al. | |
| 2015/0330001 A1* | 11/2015 | Coates | D04H 1/732 264/103 |
| 2017/0122466 A1 | 5/2017 | Sakakibara et al. | |
| 2017/0309266 A1 | 10/2017 | Akasaka et al. | |
| 2020/0230909 A1 | 7/2020 | Volkmann et al. | |
| 2021/0293449 A1 | 9/2021 | Chaut et al. | |

FOREIGN PATENT DOCUMENTS

| | | | | |
|---|---|---|---|---|
| CN | 103928022 A | 7/2014 | | |
| CN | 204020122 U | 12/2014 | | |
| CN | 104553174 A | 4/2015 | | |
| CN | 104723983 A | 6/2015 | | |
| CN | 105144284 A | 12/2015 | | |
| CN | 105855264 A | 8/2016 | | |
| CN | 106739226 A | 5/2017 | | |
| CN | 107454872 A | 12/2017 | | |
| CN | 107696649 A | 2/2018 | | |
| DE | 10261081 B3 | 2/2004 | | |
| DE | 102007060525 | 6/2009 | | |
| DE | 102011008518 | 7/2012 | | |
| DE | 102011076129 A1 | 11/2012 | | |
| DE | 112012005205 T5 | 9/2014 | | |
| EP | 1495885 B2 | 1/2005 | | |
| EP | 1741538 B1 | 1/2007 | | |
| EP | 2236286 | 10/2010 | | |
| EP | 1930192 | 11/2010 | | |
| EP | 2962875 | 1/2016 | | |
| FR | 2995827 A1 * | 3/2014 | ............ | B60H 1/3202 |
| FR | 3027817 | 5/2016 | | |
| JP | H06-156054 A | 6/1994 | | |
| JP | 2002-122289 A | 4/2002 | | |
| JP | 2008-089272 A | 4/2008 | | |
| JP | 2008-281276 A | 11/2008 | | |
| JP | 4359444 B2 | 11/2009 | | |
| JP | 2015-102593 A | 6/2015 | | |
| RU | 2117792 C1 | 8/1998 | | |
| WO | 2005/081226 | 9/2005 | | |
| WO | 2014/089251 A1 | 6/2014 | | |
| WO | 2016/118587 | 7/2016 | | |
| WO | 2016/160264 A1 | 10/2016 | | |
| WO | WO-2016187526 A1 * | 11/2016 | ............ | B32B 15/00 |

OTHER PUBLICATIONS

UTK, "Turbulence", Oct. 3, 2017 https://web.archive.org/web/20171003051229/http://labman.phys.utk.edu/phys221core/modules/m8/turbulence.html (Year: 2017).*
International Search Report and Written Opinion for International Application PCT/EP2019/071089, dated Jan. 30, 2020.
Third Communication pursuant to Art. 94(3) EPC dated Mar. 1, 2023, for European patent application No. 19165568.7.
Chinese Office Action, dated Feb. 22, 2022, for Chinese patent application No. 201980049421.4.
Chinese Office Action, dated Jan. 26, 2022, for Chinese patent application No. 201980065567.8.
Chinese Second Office Action dated Sep. 22, 2022, for Chinese Application 201980049421.4.
*Building Materials*, edited by Xianbin MENG, pp. 146-152, Northwestern Polytechnical University Press, Dec. 1989.
Chinese Notification of Rejection dated May 30, 2023, for Chinese Patent Application No. 201980065567.8.

* cited by examiner

GAS-DUCT WITH A SOUND ABSORBING COMPONENT

The present teachings relate generally to a gas-duct whose channel body is manufactured from a plastic material, wherein the channel body has at least one region replaced by a sound absorbing component being made at least partially from at least one non-woven layer. The present invention further relates to a HVAC- and Battery- and/or battery-charge-system and to a method of producing a gas-duct.

Industry is constantly seeking new and/or improved constructions and methods of providing sound and noise reduction in a variety of applications. Materials that exhibit sound absorption characteristics are often employed as a way to provide noise reduction in a wide range of industrial, commercial, and domestic applications. It is often desirable to reduce noises of machinery, engines, and the like. For example, in automotive applications, it may be undesirable for a passenger to hear noises coming from the air conditioning unit or from other places of the vehicle. Industry is also constantly seeking new methods and materials for lightweighting, such as for achieving better fuel efficiency and handling, without sacrificing the performance of the parts.

Air ducts, such as those within a vehicle, are commonly made of molded parts, such as by injection molding or by blow molding. However, injection molded parts can be heavy. In addition, these molded parts may not provide adequate sound absorption characteristics. As these rigid parts are connected within an assembly, such as by fasteners, rattling or squeaking noises may be heard as the parts rub against each other or vibrate (e.g., due to the air flowing through, due to the movement of the assembly, such as when driving a vehicle, or both).

Therefore, there is a need for new and/or improved gas-ducts for reducing leakage of air, for providing sound absorption characteristics, for reducing rattling or squeaking within the assembly, for providing a lower weight material, for providing predictable material behavior, or a combination thereof that is easily and cost-effectively produced. There is also a need for an improved method to produce a gas-duct.

The problem is solved with a gas-duct whose channel body is manufactured from a plastic material, wherein the channel body has at least one region replaced by a sound absorbing component being made at least partially from at least one non-woven layer and wherein the circumference of the component is connected to the channel body by an adhesive bond between the component and the plastic material of the channel body, resulting in an over-mold area at the component.

The disclosure regarding this embodiment of the present invention also applies to the other embodiments of the present invention and vice versa. Subject matters disclosed in combination with this embodiment can be incorporated in other embodiments and vice versa.

This embodiment of the present invention relates to a gas-duct, in which the flow of a gas, specifically air is guided. The gas-duct can, for example be part of a vehicle. This gas-duct comprises a channel body which is made from made from a plastic material and which conventionally produced by molding, specifically injection molding. The body preferably has a hollow, lengthy structure. According to the present invention, one or more regions of this channel body are replaced by a sound absorbing component being made at least partially from at least one non-woven layer. This non-woven, but gas-permeable- and/or porous layer, absorbs sound. The non-woven layer may be flat or may have a three-dimensional, for example bent, folded and/or deep-drawn, shape.

According to the present invention, the circumference of the component is connected to the channel body by an adhesive bond between the sound absorbing component and the plastic material of the channel body, resulting in an over-mold area at the sound absorbing component. This connection due to over-mould is, for example, easily produced and rattle free. The molded plastic material penetrates the porous material and solidifies there, creating a material bond between the channel body and the sound absorbing component. The rest of the sound absorbing component remains uninfluenced. Preferably, the over-mold area extends around the entire outer circumference of the sound absorbing component.

The inventive gas-duct can be produced by inserting the sound absorbing component into the mold-die in which the gas duct is molded, wherein the major part of the sound absorbing component is covered, so that it cannot be over-molded by the channel-body-material. Only the over-mold area is subjected to the molten channel body material.

The problem is also attained with a gas-duct, whose channel body being at least partially made from a sound absorbing non-woven component, wherein the non-woven component is locally weakened in a weakening region and folded around the weakening region.

The disclosure regarding this embodiment of the present invention also applies to the other embodiments of the present invention and vice versa. Subject matters disclosed in combination with this embodiment can be incorporated in other embodiments and vice versa.

According to this embodiment of the present invention, the non-woven material of the sound absorbing component is locally weakened in a weakening region to form a hinge around which the non-woven material can be formed, particularly bent. The weakening can for example be a local material removal and/or a local compression of the material, wherein the later is preferred. The non-woven material can be formed around the weakening region. The weakening region is preferably a line, for example a straight line. The non-woven sound absorbing material can be placed into a mold-die and can be formed by the die and/or can be formed prior to insertion into the die.

Another preferred or inventive embodiment of the present invention is that the non-woven layer is provided in an area of the channel body, preferably in an area in which the gas flow is turbulent.

The disclosure regarding this embodiment of the present invention also applies to the other embodiments of the present invention and vice versa. Subject matters disclosed in combination with this embodiment can be incorporated in other embodiments and vice versa.

Preferably, the non-woven layer is provided in an area of the channel body a RE (Reynolds-Number) of the gas flow>2300.

The problem is also attained with a gas-duct whose channel body is made from a sound absorbing component comprising multiple non-woven-layers.

The disclosure regarding this embodiment of the present invention also applies to the other embodiments of the present invention and vice versa. Subject matters disclosed in combination with this embodiment can be incorporated in other embodiments and vice versa.

Preferably, the sound absorbing component comprises PET (Polyethylenterephthalat) and/or PP (Polypropylen). These materials are particularly suitable to produce a durable material bond between the sound absorbing component and the channel body.

In general, the layers of the sound absorbing component must exhibit air permeability properties. However, it is contemplated that the layers of the composite material as disclosed herein may have different air permeability properties. For example, one or more layers may allow air to pass through the materials or pores of the materials. One or more layers may have a different porosity from another layer in the composite component. One or more layers may inhibit air from passing through the material. This may allow to sound absorption without allowing the air to escape through the material. The resulting component may be a non-permeable composite material, where non-permeable is understood to mean that about 10 percent or less, about 5 percent or less, or even about 1 percent or less of air contacting the material is permitted to pass through the entirety of the material. Non-permeable may be defined as no air being permitted to pass through the entirety of the material (i.e., through the entire thickness of the material). Non-permeability may also be defined in terms of pressure drop by measuring the pressure of the air on one side of the material and the pressure of air on the other side of the material (where the sides define the thickness of the material).

Air flow resistance can be measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid. Within the context of the described embodiments, air flow resistance and air flow resistivity can be assumed to also represent the specific air flow resistance, and specific air flow resistivity, respectively.

The sound absorption coefficient (SAC) and sound transmission loss (STL) level of an air permeable or porous material may be improved and tuned by layering materials together. These layers may have different levels of specific air flow resistance. The building of these types of layers creates a multi-acoustic impedance mismatched profile throughout the thickness of the composite. This mismatched profile amplifies the noise reduction capability (both SAC and STL) of the composite. The mismatched profile may also permit air to pass through certain layers but not others (or may only permit some air to pass through certain layers but not all air) so that noise is reduced but the air, or some air, is retained within the structure. Surprisingly, the results are a noise reduction and/or sound absorption at a greater level than that of the summation of the performance of the individual layers as standalone units. Therefore, the layers of materials produce a generally synergistic effect to improve sound absorption performance.

By utilizing the synergistic performance of a multi-layered composite, mass of material in each layer may be reduced in comparison to traditional single or dual layered acoustic material (e.g., a non-faced or single low air flow resistance (AFR) faced open cell foam or a single-scrim low AFR faced fiber). Reducing the mass of fiber in the matrix forming one or more layers of the composite may reduce material cost and/or manufacturing costs, as lighter weight layers may be produced more quickly than a heavier weight layer.

The performance of the multi-layer component may be about the same as or may even exceed that of traditional materials. However, multi-layer components may allow for lower overall composite thickness than traditional materials. Multi-layer components may also allow for lighter weight than traditional materials. The lower thickness of the multi-layer component may allow for better fitment into packaging space constrained areas. Shipping improvements may be realized since more material can be shipped in a finite volume at equal or greater acoustic performance as compared to a heavier and/or thicker sound absorption product.

The sound absorbing component may include one or more layers, and preferably a plurality of layers. The layers may be of different materials. Some layers may be of the same materials. The type of materials forming the layers, order of the layers, number of layers, thickness of layers, or a combination thereof, may be chosen based on the air flow resistive properties of each material, the desired air flow resistive properties of the component as a whole, the desired weight, density and/or thickness of the component (e.g., based upon the space available in the vehicle where the component will be installed), desired stiffness of the material, desired structural properties, desired insulative properties, ability to withstand particular temperatures, or a combination thereof. For example, some layers may have a lower air flow resistance while other layers may have a higher air flow resistance. The layering of layers having different air flow resistive properties may produce a multi-impedance acoustic mismatched profile through the entire acoustic composite, which provides improved noise reduction capability of the component. Therefore, the layers may be arranged so that a layer of higher specific air flow resistance is joined to or is adjacent to one or more layers of a different specific air flow resistance (e.g., a lower air flow resistance).

Any of the materials described herein may serve as one or more layers of the component. Any of the materials described herein may be combined with other materials described herein (e.g., in the same layer or in different layers of the component). The component may include a plurality of layers, some or all of which serve different functions or provide different properties to the composite (when compared to other layers of the composite). The ability to combine layers of materials having different properties may allow the composite to be customized based on the application. For example, one or more layers may provide structural properties to the composite or structure formed therefrom. One or more layers may provide air flow resistive properties to the composite or structure formed therefrom. One or more layers may provide non-permeable characteristics to the composite or structure formed therefrom. One or more layers may provide insulation. One or more layers may provide temperature resistance (e.g., may be able to withstand elevated temperatures, such as those about 150° C. or higher, about 200° C. or higher, about 300° C. or lower, about 250° C. or lower, or a combination thereof). One or more composite layers may include one or more adhesive materials (e.g., as part of the fibers of the layer or as a separate element in or on the layer) for binding the fibers together, for binding layers together, for binding structures formed from the composite material together, or a combination thereof. One or more composite layers may support a facing material or top layer, such as a foil or film layer. One or more composite layers may provide heat resistance (e.g., if the composite is located in an area that is exposed to high temperatures). One or more composite layers may provide stiffness to the composite. One or more composite layers may provide flexibility and/or softness to the composite material. One or more composite layers may extend over the entirety of another layer. One or more composite layers may extend over only a portion of another layer (e.g., acting as a patch or to provide desired properties or reinforcement in a specific location). One or more composite layers may attach directly to a wall or surface of a substrate to provide acoustic absorption. One or more composite layers may be any material known to exhibit sound absorption characteristics. One or more composite layers may be at least partially formed from fibrous material. One or more composite layers may be at least partially formed as a web of material (e.g., a fibrous web). One or more composite layers may be formed from nonwoven material, such as short fiber nonwoven materials. One or more composite layers may be a film or foil, such as a thermoformable film or foil. One or more composite layers may be a porous bulk absorber (e.g., a lofted porous bulk absorber formed by a carding and/or lapping process). One or more composite layers may be formed by air laying. One or more layers may be a nonwoven layer. The nonwoven layer may be a needlepunched material, a spun-bond material, a melt-blown material, a spun-laced material, an air-laid material, or a combination thereof. One or more layers or one or more components of the composite material may be formed by injection molding. The injection molded part or layer may be adhered or fastened, for example, to the composite material. The composite (or one or more of the composite layers) may be an engineered 3D structure. It is clear from these potential layers that there is great flexibility in creating an acoustic material that meets the specific needs of an end user, customer, installer, and the like. The combination of any of these layers and properties is contemplated to be within the scope of the teachings herein.

One or more layers of the sound absorbing component may have a relatively high air flow resistance to present acoustic impedance to the sound pressure wave incident upon the material. Air permeability should be managed to ensure predictable and consistent performance. This may be achieved through management of fiber sizes, types, and lengths, among other factors. In some applications, desirable levels of air permeability may be achieved by combining plural nonwoven materials of differing densities together to form a composite product. A combination of materials having low permeability, or even substantially no permeability, with those having high permeability can be used to achieve locally reactive acoustic behavior.

The sound absorbing component may comprise one or more nonwoven layers (e.g., one or more needlepunched layers, one or more spun-bond layers, one or more melt-blown layers, one or more spun-lace layers, or a combination thereof); one or more film or foil layers; one or more core material layers; one or more nonwoven material layers; or a combination thereof.

The sound absorbing component may include one or more fibrous layers, which may be referred to herein as a core layer, a fibrous sheet, a nonwoven layer, or a combination thereof. Where one of these terms is used, it is intended to refer to any of these terms. While referred to herein separately, one or more nonwoven layers (e.g., one or more needlepunched layers, one or more spun-bond layers, one or more melt-blown layers, one or more spun-laced layers, one or more air-laid layers, or a combination thereof) may also be formed of the fibers disclosed herein. The fibers that make up one or more layers of the composite material may have a linear mass density from about 0.25 denier or greater, about 0.5 denier or greater, or about 1 denier or greater. The material fibers that make up the composite material or one or more layers thereof may be about 150 denier or less, about 120 denier or less, or about 100 denier or less. Certain layers may have an average denier that is higher than other layers. The average denier may depend upon the fibers used. For example, a layer having natural fibers may have an average denier of about 100 denier±about 20 denier. The fibers may have a staple length of about 0.5 mm or greater, about 1.5 millimeters or greater, or even about 70 millimeters or greater (e.g., for carded fibrous webs). Fibers within the layer may have a length of about 300 millimeters or less, about 250 millimeters or less, or about 200 millimeters or less. For example, the length of the fibers may be between about 30 millimeters and about 65 millimeters, with an average or common length of about 50 or 51 millimeters staple length, or any length typical of those used in fiber carding processes. Fiber lengths may vary within a layer. For example, a core layer may have fibers ranging from about 1 mm or about 120 mm. The length of the fibers used may depend on the processing to form the layer. For example, a carded and/or needle punched layer may require fibers of a certain length (e.g., at least some of the fibers having a length of about 30 mm or longer).

Short fibers may be used. For example, some or all of the fibers may be a powder-like consistency (e.g., with a fiber length of about 0.25 mm or more, about 0.5 mm or more, or about 1 mm or more; about 5 mm or less, about 4 mm or less, or about 3 mm or less). Fibers of differing lengths may be combined to form a fibrous layer or other layer of the fibrous structure. The fiber length may vary depending on the application, the properties desired, dimensions and/or properties of the material (e.g., density, porosity, desired air flow resistance, thickness, size, shape, and the like of the layer), or any combination thereof. Again, more effective packing of the shorter fibers may allow pore size to be more readily controlled in order to achieve desirable acoustic characteristics, air flow characteristics, or both. In some applications, the use of shorter fibers, or the use of a combination of fibers, may have advantages for forming a material that exhibits acoustic absorption properties. The selected air flow resistivity achieved using short fibers may be significantly higher than the air flow resistivity of a conventional nonwoven material comprising substantially only conventional staple fibers having a long length of, for example, from at least about 30 mm and less than about 100 mm. Without being limited by theory, it is believed that this unexpected increase in air flow resistance may be attained as a result of the short fibers being able to pack more efficiently (e.g., more densely) in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flow resistivity. In particular, the improvement in fiber packing may achieve a reduced interstitial space in between fibers of the nonwoven material to create a labyrinthine structure that forms a tortuous path for air flow through the material, thus providing a selected air flow resistance, and/or selected air flow resistivity. Accordingly, it may be possible to produce comparatively lightweight nonwoven materials without unacceptably sacrificing performance.

The fibrous layer may include natural or synthetic fibers. The fibrous layer may include inorganic fibers. Suitable fibers may include cotton, jute, wool, cellulose, glass, silica-based, ceramic fibers, or any combination thereof. Suitable synthetic fibers may include polyester, polypropylene, polyethylene, Nylon, aramid, imide, acrylate fibers, or combination thereof. The fibrous layer material may comprise polyester fibers, such as polybutylene terephthalate (PBT), polyethylene terephthalate (PET), and co-polyester/polyester (CoPET/PET) adhesive bi-component fibers. The fibers may include polyacrylonitrile (PAN), oxidized polyacrylonitrile (Ox-PAN, OPAN, or PANOX), olefin, polyamide, polyetherketone (PEK), polyetheretherketone (PEEK), polyethersulfone (PES), or other polymeric fibers. The fibers may be selected for their melting and/or softening temperatures. The fibers may be 100% virgin fibers, or may contain fibers regenerated from postconsumer waste (for example, up to about 90% fibers regenerated from postconsumer waste or even up to 100% fibers regenerated from postconsumer waste).

One or more fibrous sheet (or any other layer of the fibrous structure) may include a binder or binder fibers. Binder may be present in the fibrous layer in an amount of about 40 percent by weight or less, about 30 percent by weight or less, about 25 percent by weight or less, or about 15 percent by weight or less. The binder may be present in an amount of about 1 percent by weight or greater, about 3 percent by weight or greater, or about 5 percent by weight or greater. The fibrous layer may be substantially free of binder. The fibrous layer may be entirely free of binder. While referred to herein as fibers, it is also contemplated that the binder could be generally powder-like (e.g., with a fiber length of about 3 millimeters or less, or about 2 millimeters or less, or even smaller, such as about 20 microns or greater, about 40 microns or greater, about 100 microns or greater, about 200 microns or greater, or about 500 microns or greater), spherical, or any shape capable of being received within interstitial spaces between other fibers and capable of binding the fibrous layer together. The binder may have a softening and/or melting temperature of about 180° C. or greater, about 200° C. or greater, about 225° C. or greater, about 230° C. or greater, or even about 250° C. or greater. The fibers may be high-temperature thermoplastic materials. The fibers may include one or more of polyamideimide (PAI); high-performance polyamide (HPPA), such as Nylons; polyimide (PI); polyketone; polysulfone derivatives; polycyclohexane dimethyl-terephthalate (PCT); fluoropolymers; polyetherimide (PEI); polybenzimidazole (PBI); polyethylene terephthalate (PET); polybutylene terephthalate (PBT); polyphenylene sulfide; syndiotactic polystyrene; polyetherether ketone (PEEK); polyphenylene sulfide (PPS), silica-based binder systems; and the like. The fibrous layer may include polyacrylate and/or epoxy (e.g., thermoset and/or thermoplastic type) fibers. The fibrous layer may include a multi-binder system. The fibrous layer may include one or more sacrificial binder materials and/or binder materials having a lower melting temperature than other fibers. The fibrous layer may include binder materials that are formulated to achieve or impact desired characteristics, such as flame retardance or super absorbance.

The fibrous layer (or any other layer of the fibrous structure) may include a plurality of bi-component fibers. The bi-component fibers may act as a binder within the fibrous layer. The bi-component fibers may be a thermoplastic lower melt bi-component fiber. The bi-component fibers may have a lower melting temperature than the other fibers within the mixture. The bi-component fiber may be of a flame retardant type (e.g., formed from or including flame retardant polyester). The bi-component fibers may enable the fibrous layer to be air laid or mechanically carded, lapped, and fused in space as a network so that the material may have structure and body and can be handled, laminated, fabricated, installed as a cut or molded part, or the like to provide insulation properties, acoustic absorption, structural properties, filtration properties, fire retardant properties, smoke retardant properties, low toxicity, or a combination thereof. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which the fibrous layer (or other layer of the fibrous structure) is heated to soften the sheath material of the bi-component may depend upon the physical properties of the sheath material. Some fibers or parts of the fibers (e.g., the sheath) may be crystalline, or partially crystalline. Some fibers or parts of the fibers (e.g., the sheath) may be amorphous.

For a polyethylene or polypropylene sheath, for example, the temperature may be about 140 degrees C. or greater, about 150 degrees C. or greater, or about 160 degrees C. or greater. The temperature may be about 220 degrees C. or less, about 210 degrees C. or less, or about 200 degrees C. or less. Bi-component fibers having a polyethylene terephthalate (PET) sheath or a polybutylene terephthalate (PBT) sheath, for example, may melt at about 180 degrees C. to about 240 degrees C. (e.g., about 230 degrees C.). The bi-component fibers may be formed of short lengths chopped from extruded bi-component fibers. The bi-component fibers may have a sheath-to-core ratio (in cross-sectional area) of about 15% or more, about 20% or more, or about 25% or more. The bi-component fibers may have a sheath-to-core ratio of about 50% or less, about 40% or less, or about 35% or less.

The fibers may have or may provide improved thermal insulation properties. The fibers may have relatively low thermal conductivity. The fibers may have geometries that are non-circular or non-cylindrical (e.g., to alter convective flows around the fiber to reduce convective heat transfer effects within the three-dimensional structure). The fibrous layer may include or contain engineered aerogel structures to impart additional thermal insulating benefits. The fibrous layer may include or be enriched with pyrolized organic bamboo additives. Some fibers may be sacrificial upon exposure to certain temperatures. For example, if the fibrous layer is exposed to a temperature of about 250° C. or greater, some of the fibers may volatilize away.

The fibers forming the fibrous layer include an inorganic material. The inorganic material may be any material capable of withstanding temperatures of about 250° C. or greater, about 500° C. or greater, about 750° C. or greater, about 1000° C. or greater. The inorganic material may be a material capable of withstanding temperatures up to about 1200° C. (e.g., up to about 1150° C.). The inorganic fibers may have a limiting oxygen index (LOI) via ASTM D2836 or ISO 4589-2 for example that is indicative of low flame or smoke. The LOI of the inorganic fibers may be higher than the LOI of standard binder fibers. For example, the LOI of standard PET bicomponent fibers may be about 20 to about 23. Therefore, the LOI of the inorganic fibers may be about 23 or greater. For example, the LOI may be about 100. The inorganic fibers may have an LOI that is about 25 or greater. The inorganic fibers may be present in the fibrous layer in an amount of about 60 percent by weight or greater, about 70 percent by weight or greater, about 80 percent by weight or greater, or about 90 percent by weight or greater. The inorganic fibers may be present in the fibrous layer in an amount of about 100 percent by weight or less. The inorganic fibers may be selected based on a desired stiffness. The inorganic fibers may be crimped, non-crimped, or a combination thereof. Non-crimped organic fibers may be used when a fiber with a larger bending modulus (or higher stiffness) is desired. The modulus of the inorganic fiber may determine the size of the loops when the lapped fibrous structure is formed. Where a fiber is needed to bend more easily, a crimped fiber may be used. The inorganic fibers may be ceramic fibers, glass fibers, mineral-based fibers, or a combination thereof. Ceramic fibers may be formed from polysilicic acid (e.g., Sialoxol or Sialoxid), or derivatives of such. For example, the inorganic fibers may be based on an amorphous aluminum oxide containing polysilicic acid. Siloxane, silane, and/or silanol may be added or reacted into the fibrous layer to impart additional functionality. These modifiers could include carbon-containing components.

Any inorganic fibers of the fibrous layer may have an average linear mass density of about 0.4 denier or greater, about 0.6 denier or greater, or about 0.8 denier or greater. The inorganic fibers of the fibrous layer may have an average linear mass density of about 2.0 denier or less, about 1.7 denier or less, or about 1.5 denier or less. Other fibers of the fibrous layer (e.g., bicomponent binder) may have an average linear mass density of about 1 denier or greater, about 1.5 denier or greater, or about 2 denier or greater. Other fibers of the fibrous layer (e.g., bicomponent binder) may have an average linear mass density of about 20 denier or less, about 17 denier or less, or about 15 denier or less. The inorganic fibers of the fibrous layer may have a length of about 20 mm or greater, about 27 mm or greater, or about 34 mm or greater. The inorganic fibers of the fibrous layer may have a length of about 200 mm or less, about 150 mm or less, or about 130 mm or less. A combination of fibers having varying lengths may be used. For example, a combination of about 67 mm and about 100 mm lengths may be used. Varying lengths may be advantageous in some instances, as there may be natural cohesion of the fibers due to the length difference of the fibers, the type of fibers, or both. The blend of fibers of the fibrous layer may have an average denier size of about 1 denier or greater, about 5 denier or greater, or about 6 denier or greater. The blend of fibers of the fibrous layer may have an average denier size of about 10 denier or less, about 8 denier or less, or about 7 denier or less. For example, the average denier size may be about 6.9 denier.

The fibers, or at least a portion of the fibers, may have high infrared reflectance or low emissivity. At least some of the fibers may be metallized to provide infrared (IR) radiant heat reflection. To provide heat reflective properties to and/or protect the fibrous layer, the fibers may be metalized. For example, fibers may be aluminized. The fibers themselves may be infrared reflective (e.g., so that an additional metallization or aluminization step may not be necessary). Metallization or aluminization processes can be performed by depositing metal atoms onto the fibers. As an example, aluminization may be established by applying a layer of aluminum atoms to the surface of fibers. Metalizing may be performed prior to the application of any additional layers to the fibrous layer. It is contemplated that other layers of the fibrous structure may include metallized fibers in addition to, or instead of, having metallized fibers within the fibrous layer.

The metallization may provide a desired reflectivity or emissivity. The metallized fibers may be about 50% IR reflective or more, about 65% IR reflective or more, or about 80% IR reflective or more. The metallized fibers may be about 100% IR reflective or less, about 99% IR reflective or less, or about 98% IR reflective or less. For example, the emissivity range may be about 0.01 or more or about 0.20 or less, or 99% to about 80% IR reflective, respectively. Emissivity may change over time as oil, dirt, degradation, and the like may impact the fibers in the application.

Other coatings may be applied to the fibers, metallized or not, to achieve desired properties. Oleophobic and/or hydrophobic treatments may be added. Flame retardants may be added. A corrosion resistant coating may be applied to the metalized fibers to reduce or protect the metal (e.g., aluminum) from oxidizing and/or losing reflectivity. IR reflective coatings not based on metallization technology may be added.

The fibers of the fibrous layer may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation. Any, a portion, or all of the fibers used in the matrix could be of the low flame and/or smoke emitting type (e.g., for compliance with flame and smoke standards for transportation). Powders or liquids may be incorporated into the matrix that impart additional properties, such as binding, fire/smoke retarding intumescent, expanding polymers that work under heat, induction or radiation, which improves acoustic, physical, thermal, and fire properties. For example, active carbon powder may be incorporated into the fibrous layer, one or more nonwoven layers, or both.

The sound absorbing component may include one or more layers that are air permeable, such as one or more needlepunched layers, one or more spun-bond layers, one or more melt-blown layers, one or more spun-laced layers, one or more air-laid layers, or a combination thereof. These layers may be referred to herein as a nonwoven layer. The air-permeable layer may be a layer adapted to face the source of air flow or to directly contact a stream of air, thereby allowing the air to travel into other layers of the component (e.g., the core or fibrous layer). The layer may, for example, define a cavity of an air duct. The layer may be a flexible material, which may provide flexibility to the component.

The air-permeable layer may be formed from a nonwoven material. The layer may be formed from a textile material. The layer may be formed by needle-punching, alone or in combination with any of the methods of forming layers described herein or known in the art. The layer may be compressed using one or more methods, such as with a press, laminator, set of calender rolls, or the like. The layer may be compressed and melted in a thermoforming step. The layer may be formed using any nonwoven technologies. For example, the layer may be spun bound, melt blown, cross-laid, compressed air laid, SMS, spunlaced, direct laid, wet laid, dry laid, the like, or a combination thereof. The layer may be formed from any fibers capable of being mechanically or thermally bonded to each other.

The air-permeable (e.g., needlepunched) layers may be formed of any of the fibers discussed above with respect to the fibrous layer. One or more air-permeable layers may be adapted to face a source of sound waves. One or more air-permeable layers may be adapted to face away from a source of sound. One or more air-permeable layers may be adjacent to one or more fibrous layers. One or more air-permeable layers may be secured to a surface of one or more fibrous layers. Two or more air-permeable layers may sandwich a fibrous layer in forming the sound absorbing component. The air-permeable layers may be the same composition and/or structure. The air-permeable layers may be of different compositions and/or structures. The one or more air-permeable layers may have a weight of about 10 grams per square meter (GSM) or more; about 50 GSM or more, about 75 GSM or more, about 100 GSM or more; or about 200 GSM or more. The one or more air-permeable layers may have a weight of about 500 GSM or less, about 400 GSM or less, or about 300 GSM or less. The weight may be dependent upon the material forming the air-permeable layer. For example, a needlepunched layer may be about 75 GMS or greater. A spun-bond layer may have a weight of about 20 GSM or less.

One or more layers of the sound absorbing component may be a film, foil, or facing laminate. One or more layers of the sound absorbing component may have a film, foil, or facing attached to at least a portion of the layer. While referred to herein as a film, foil, or facing layer, this also encompasses films, foils, or facings that do not cover the entirety of another layer. For example, a part may be a hybrid part including some areas with a film, foil, or facing, and some areas that are free of a film, foil, or facing. It is also contemplated that the sound absorbing component may be free of any film, foil, or facing. The film, foil, or facing layer may function as a non-permeable layer so that air is substantially prevented from passing through the layer (i.e., so that about 10% or less, about 5% or less, or about 1% or less of all air passes through the layer). The film, foil, or facing layer may include perforations, holes, voids, or other openings to allow for air and/or sound waves to travel therethrough. The sound absorbing component may include areas that are free of the film, foil, or facing to control where air and/or sound waves are permitted to travel. The layer may provide protective properties to the sound absorbing component. The material(s) forming the layer may provide thermoformable properties to the layer, or to the sound absorbing component as a whole, so that the sound absorbing component may be shaped into a three-dimensional structure, for example. The layer may be a generally solid layer. The layer may be formed from one or more layers, or a plurality of layers.

The film, foil, or facing laminate may be impermeable. In such a case, the air flow resistance would be infinite, or near infinite. As air flow resistance is proportional to the inverse of the air permeability. As air permeability may be 0, or about 0, for a non-permeable material, the air flow resistance would then be infinite. Air permeability of the film, foil, or facing layer, may be about 0 l/m²/s or more, about 50 l/m²/s or more, or about 100 l/m²/s or more at 200 Pa. Air permeability of the film, foil, or facing layer, may be about 400 l/m²/s or less, about 300 l/m²/s or less, or about 250 l/m²/s or less at 200 Pa.

The film, foil, or facing laminate may be applied to another component layer, which may act as a facing. The film may be any polymeric film, for example a polyester (e.g., PET) film, a polyurethane film, or both. While referred to as a layer, the film, foil, or facing laminate itself may be formed from one or more layers. The non-permeability of the layer may be achieved through a multi-layer film, such as a film formed from thermoplastic polyurethane and thermoplastic polyester elastomer-based layers. For example, the film, foil or facing laminate may include 1 or more layers, 2 or more layers, or 3 or more layers. The film, foil, or facing laminate may include 15 or fewer layers, 12 or fewer layers, or 10 or fewer layers. The foil or film layer may exhibit high thermal barrier properties and may remain stable at extreme temperatures. Exemplary film layers include APT 9924, available from Advance Packaging Technologies (Waterford, Michigan); or TC 4070 CX 20 B/A, available from Prochimir Technical Films (Pouzauges, France).

The film may be a reflective film. The facing laminate may be a foil (e.g., a reinforced foil, a metallic foil, or both). The foil may be laminated to another component layer. For example, the foil may be a laminated reinforced aluminum foil. The layer may be applied over other layers of the sound absorbing component to provide localized heat reflection without considerably sacrificing the properties of the underneath sound absorbing component and without reducing the acoustic absorption capacity of the existing base material (the one or more composite layers). For an outermost layer of the sound absorbing component, to provide heat reflective properties and protect the composite layers underneath, the outermost layer may be metalized or aluminized. The outermost layer itself may be metallic (e.g., so that an additional metallization or aluminization step may not be necessary).

The sound absorbing component may include an optional additional air permeable layer located between the film, foil, or facing layer and the core material layer. The layer may enhance the acoustic impedance mismatch, between the layers especially when positioned between the core material and the film, foil or facing material. As the layer is permeable, it may also act similarly to an air gap between the film, foil or facing material and the core material layer to further enhance acoustic absorption, as sound waves are permitted to pass through the inner air permeable material, core material layer and optional additional air permeable layer and reflect off of the film, foil, or facing material and back into the optional air permeable layer and core material layer (and any additional layers).

The sound absorbing component may include one or more overmolded areas, layers, or features, also referred to herein as the overmolded portion. The overmold material preferably covers only a portion of another layer of the composite material. The overmold portion is bonded to the composite material through an injection molding process. The overmolded portion may provide additional structure and/or reinforcement to the composite material. The overmolded portion may allow for integration of other features to the composite material, such as fasteners, clips, ribs, other structural elements, or features that cannot be created using traditional thermoforming techniques. However, the material bond between the overmould and the component may be the fastening itself, which is preferably irreversible. Use of overmolding processes may allow for adding functions to the part or composite material, such as clips, grids, fasteners, and the like. Overmolding may reinforce the part or composite material, such as through the addition of ribs. Overmolding may provide or ensure dimensional tolerances that cannot be achieved through thermoforming. This may allow for easier, more secure, or more precise connections to other parts in the system, or geometrically accurate joint areas. Geometrically accurate joint areas are areas of connection or that contact other parts when in assembly, where the parts fit together (e.g., male and female members), such as in a geometrically complementary fashion. The overmolded portion may be formed from any material used in a plastic injection process.

The overmolded portion may be formed from a polymeric material, such as, but not limited to, Nylon 6, with or without glass fibers; Nylon 6.6, with or without glass fibers; polypropylene; polyethylene terephthalate; polycarbonate; acrylonitrile butadiene styrene; or a combination thereof. The composite material is able to be overmolded, as it may have a higher AFR and/or higher open porosity as compared to a needlepunched material only. The overmolded material may adhere to another layer of the composite material through penetration into pores of the composite material or holes (which may be added manually or mechanically) formed in the composite material. The overmolded material will form a strong bond with the one or more layers to which it is molded, and this bond will be maintained in the end-use environment for the composite material.

The layer of the component that is in contact with the overmold is preferably a needle punched layer, more preferably comprising PE and/or PET.

Each component layer may be formed to have a thickness and density selected according to the required physical and air permeability properties desired of the finished component layer (and/or the composite material as a whole). The component layer may be any thickness depending on the application, location of installation, shape, fibers used (and the lofting of the composite layer), or other factors. The density of the component layer may depend, in part, on the specific gravity of any additives incorporated into the material comprising the layer (such as nonwoven material), and/or the proportion of the final material that the additives constitute. Bulk density generally is a function of the specific gravity of the fibers and the porosity of the material produced from the fibers, which can be considered to represent the packing density of the fibers. The total thickness of the sound absorbing component may depend upon the number and thickness of the individual layers. The sound absorbing component is beneficial, as the thickness and properties can be tuned to have the desired weight, thickness, and acoustic and/or structural properties. The sound absorbing component can be customized. Customizations include the number of layers, types of layers, and compression of layers.

Considering the types of layers that may be used as described herein, the multi-layered component may vary the specific air flow resistances between the layers of the sound absorbing component to enhance sound absorption, reduce air leakage from the sound absorbing component, or both. The multi-layered component may have a top or outer layer (e.g., foil or film layer), and one or more layers below the top layer (e.g., one or more fibrous layers, such as a core layer, an air permeable layer, such as a flexible textile nonwoven material, or both). The top or outer layer of the sound absorbing component may be a layer having a high air flow resistance, or may be substantially non-permeable. For example, the top or outer layer may have an air permeability of about 0 l/m²/s to about 250 l/m²/s at 200 Pa. The top or outer layer may be a film, facing laminate, or foil.

The sound absorbing component having multiple layers may have a high air flow resistivity. For example, one or more layers of the sound absorbing component, or the sound absorbing component as a whole, may have an air flow resistivity of about 100 Rayls/m or more, about 400 Rayls/m or more, about 800 Rayls/m or more, or about 1000 Rayls/m or more. The fibrous sound absorbing component may have an air flow resistivity of about 200,000 Rayls/m or less, about 150,000 Rayls/m or less, or about 100,000 Rayls/m or less. Low density fibrous sound absorbing component may even have an air flow resistivity of up to about 275,000 Rayls/m. One or more layers of the sound absorbing component, or the sound absorbing component as a whole, may have an air flow resistivity of about 100,000 Rayls/m or higher, about 275,000 Rayls/m or higher, 1,000,000 Rayls/m or higher, or even 2,000,000 Rayls/m or higher. Additional sound absorption may also be provided by a skin layer or other layer on a fibrous layer (e.g., by an in-situ skinning process), facing layer, one or more functional layers, or a combination thereof. A skin layer or other layer as described herein of the fibrous structure may provide additional air flow resistance (or air flow resistivity) to the fibrous structure. For example, the skin layer may have an air flow resistivity of about 100,000 Rayls/m or higher, about 275,000 Rayls/m or higher, 1,000,000 Rayls/m or higher, or even 2,000,000 Rayls/m or higher.

The sound absorbing component, or layers thereof, may have a high open porosity. The high open porosity may allow for the sound absorbing component, or one or more fibrous layers of the sound absorbing component, to be overmolded. A high open porosity indicates that a high fraction of the material volume is air. Open porosity means that the air cavities or channels trapped into the material are in communication with each other. Such open porosity may permit the overmolding or overinjection processes as described herein. The melted material is forced into the cavities or channels during injection and upon cooling, the material is anchored within the porous material. This leaching of the material into other parts of the composite material may be controlled (e.g., prevented from filling all of the pores), so that other properties, such as acoustic absorption, are maintained. The porosity may be less than the porosity of a needle punched layer alone, for example. For example, the composite material, or one or more layers thereof, may have a porosity of about 50 percent or greater, or about 55 percent or greater prior to thermocompression of the material. The composite material, or one or more layers thereof, may have a porosity of about 90 percent or less, or about 80 percent or less prior to thermocompression of the material. For example, porosity may be about 59 percent to about 77 percent, where the percentage is the volume of the material that is air.

The sound absorbing component, or layers thereof, may have sufficient rigidity that it maintains its desired shape. The sound absorbing component, or layers thereof, may be resistant to sagging (e.g., as compared to low density polyethylene or expanded polypropylene). The material may be shaped to fit within a desired location or to be installed in a particular application, and the material will maintain its shape, even in generally planar, unsupported, or cantilevered positions, for example.

The present teachings also include methods of forming the sound absorbing component. The fibers forming one or more layers of sound absorbing component, or the sound absorbing component as a whole, may be formed into a nonwoven web using nonwoven processes including, for example, blending fibers (e.g., blending bi-component fibers, conventional staple fibers, or combination thereof), carding, lapping, air laying, mechanical formation, or combination thereof. The fibers of one or more composite layers may be opened and blended using conventional processes. The fibers may be blended within the structure of the fibrous web. A carded web may be cross-lapped or vertically lapped, to form a voluminous nonwoven web. The carded web may be vertically lapped according to processes such as "Struto" or "V-Lap", for example. This construction provides a web with relative high structural integrity in the direction of the thickness of the composite sound absorber, thereby minimizing the probability of the web falling apart during application, or in use. Carding and lapping processes create a nonwoven fiber layer that has good compression resistance through the vertical cross-section and enables the production of a lower mass acoustic treatment, especially with lofting to a higher thickness without adding significant amounts of fiber to the matrix. It is contemplated that a small amount of hollow conjugate fiber (i.e., in a small percentage) may improve lofting capability and resiliency to improve sound absorption. Such an arrangement also provides the ability to achieve a low density web with a relatively low bulk density. An air laid or mechanically formed web may also be produced, though formation of a bulk layer by a lapping process may enable higher thickness at lower weights (or lower densities) as compared to air laying. The web may then be thermally bonded, air bonded, mechanically consolidated, the like, or combination thereof, to form a cohesive nonwoven insulation material. The web may be compressed, which may allow for the porosity of the material to be controlled based on desired properties or to allow the material to be overmolded.

One or more of the layers of the present teachings may be formed from a blend of fibers, including short fibers. One or more layers may be a short fiber technology-based (SFT-based) material. The SFT-based material may be formed using any processes for arranging fibers, such as gravity deposition, air laying, carding, lapping, or any combination thereof. The SFT-based materials may be densified, such as by compressing the materials, calendering the materials, or another employing another method of pressing.

One or more component layers may be bonded together to create a fibrous sheet. One or more of the layers may be thermally activated. For example, the layers may be activated in an air-circulating oven. The layers may be activated by a heating system. The layers may be activated by IR heating. The layers may then be compressed to a desired thickness. For example, compression may occur through a lamination process or a calendering process. One or more layers may be bonded together by elements present in the layers. For example, binder fibers in the layers may serve to bond the layers together. The outer layers (i.e., the sheath) of bi-component fibers in one or more layers may soften and/or melt upon the application of heat, which may cause the fibers of the individual layers to adhere to each other and/or to adhere to the fibers of other layers. One or more adhesives may be used to join two or more layers. The adhesives may be a powder or may be applied in strips, sheets, or as a liquid, for example.

Any arrangement and combination of layers is contemplated. The sound absorbing component may include two or more of any layer as described herein. The air-permeable layers may be formed of the same material. The air-permeable layers may be formed of different materials. Any or all of the layers may be co-extensive with one or more of the other layers. One or more of the layers may extend over only part of an adjacent layer.

The layers of the sound absorbing component may be formed into a fibrous sheet. As any or all of the layers may contain one or more thermoplastic and/or thermoset materials (e.g., binders), the sound absorbing component may be heated and thermoformed into a specifically shaped thermoformed product. Acoustic properties of the sound absorbing component (and/or its layers) may be impacted by the shape of the sound absorbing component. The sound absorbing component, or one or more of its layers, may be generally flat. The finished c sound absorbing component may be fabricated into cut-to-print two-dimensional flat parts for installation into the end user, installer, or customer's assembly. The composite may be formed into any shape. For example, the sound absorbing component may be molded to generally match the shape of the area to which it will be installed. The finished sound absorbing component may be molded-to-print into a three-dimensional shape for installation into the end user, installer, or customer's assembly. The three-dimensional geometry of a molded product may provide additional acoustic absorption. The three-dimensional shape may provide structural rigidity and an air space.

The present teachings may include a step of over-molding a fibrous sheet or sound absorbing component. The fibrous sheet (e.g., one including one or more fibrous layers, one or more nonwoven layers, one or more films, foils, or facing layers, or a combination thereof) may withstand higher pressures than materials such as a nonwoven layer, such as a needle punched layer, alone, thereby allowing for a higher pressure to be used during the injecting molding process. For example, a standard injection pressure may be used. The fibrous sheet may be able to withstand such pressures due to the porosity of the material, for example. The fibrous sheet may have areas with local compressions (e.g., where porosity is about 0) that act as a border to prevent any injection material into the fibrous layer or core layer.

As an example, a fibrous sheet, which may include one or more fibrous layers, one or more nonwoven layers, one or more film, foil, or facing layers, or a combination thereof, may be formed as a generally flat sheet. The fibrous sheet may be fed into a conditioning oven, where it is preheated. For example, the conditioning oven may be heated to a temperature of about 150° C. or greater, about 175° C. or greater, or about 200° C. or greater. The conditioning oven may be heated to a temperature of about 250° C. or less, about 240° C. or less, or about 220° C. or less. The preheated fibrous sheet may be fed to a thermoforming tool, where it is molded into a desired shape and/or to have a desired topography. The molded sheet may have excess material that is trimmed (e.g., via die cutting). The excess material may be recycled. The thermoformed part may then be overmolded to add additional features to the fibrous sheet, thereby forming the finished composite material. It is contemplated that adhesives or other fasteners may be used to at least aid in the installation of the part to its end use location.

For example, one or more sheets of composite material may be shaped to form a generally hollow member, such as an air duct, where the composite material defines one or more channels through which air or another fluid can travel. A single sheet may be thermoformed to form the generally hollow member. Two or more sheets may be thermoformed into a generally hemispherical or half-circular shape, for example. The sheets may be formed to have a lip portion at the edges, and the sheets may be joined together at the lip portions to form a full circle, oval, or other hollow shape. The foil or film layer may be arranged to face outwardly to reduce or prevent air leakage from the generally hollow member such as an air duct.

The gas duct is preferably used as part of a HVAC-System. Another embodiment of the present invention is therefore a HVAC-System comprising the inventive gas-duct.

The gas duct is preferably used as part of a Battery- and/or battery-charge-system. Another embodiment of the present invention is therefore a Battery- and/or battery-charge-system comprising the inventive gas-duct.

Another subject matter of the present invention is a method of producing the inventive gas duct gas-duct, wherein:
  a sound absorbing component is provided,
  the sound absorbing material is placed in a die,
  the sound absorbing material is over-molded around its
    circumference by the plastic material of channel body
    and after solidification of the plastic material, a material bond is created between the component and the plastic material of the channel body.

The disclosure regarding this embodiment of the present invention also applies to the other embodiments of the present invention and vice versa. Subject matters disclosed in combination with this embodiment can be incorporated in other embodiments and vice versa.

Another subject matter of the present invention is a method of producing the inventive gas-duct, wherein:
- a sound absorbing component is locally compressed and/or locally weakened to form one or more hinge(s),
- the sound absorbing component is folded to form a sound absorbing body.

The disclosure regarding this embodiment of the present invention also applies to the other embodiments of the present invention and vice versa. Subject matters disclosed in combination with this embodiment can be incorporated in other embodiments and vice versa.

The weakening of the material can be accomplished by removing locally part of the material of one or more layers. This can be done by cutting, for example laser cutting. The material is preferably removed along a line, preferably a straight line.

The weakening can also be accomplished by locally compressing one or more layers of the component, preferably irreversibly. The compression can be carried out under the influence of heat and/or pressure. The material is preferably compressed along a line, preferably a straight line.

The weakening forms a hinge abound which part of the component can be bent relative to each other to form a body.

The body is preferably placed into a mold-die to over-mold the body, preferably partially.

The inventions are now explained according to the Figures. These explanations do not limit the scope of protection. The explanations apply to all embodiments of the present invention likewise.

Figure 1:
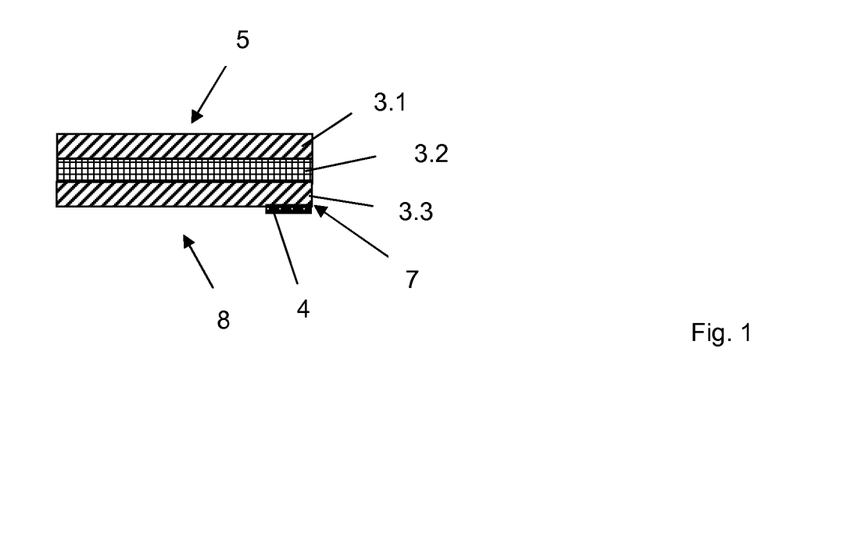
FIG. 1 shows the sound absorbing component.

FIG. 1 shows one embodiment of the sound absorbing component 5. In the present case, it comprises three layers 3.1-3.3. Preferably, at least one preferably two layers 3.1, 3.3 are needle punched layers. One layer 3.2 is preferably a non-woven layer made from fibers. In the present case, the needle punched layers 3.1-3.3 are the outer layers, while the non-woven fiber layer 3.2 is the needle punched layer. Preferably, the layers 3.1-3.3 are laminated together. The layer 3.3 is in the present case partially over-molded by an over-mold area 4. This over-mold area 4 is provided at interface 7 to the component 5. The over-mold area 4 is preferably part of a channel body 2 of a gas duct 1. During over-molding, the molten plastic material from which the area 4 is made, will partially penetrate the layer 3.3 and solidify and thereby produce an adhesive bond between the component 5 and the area 4.

Figure 2:
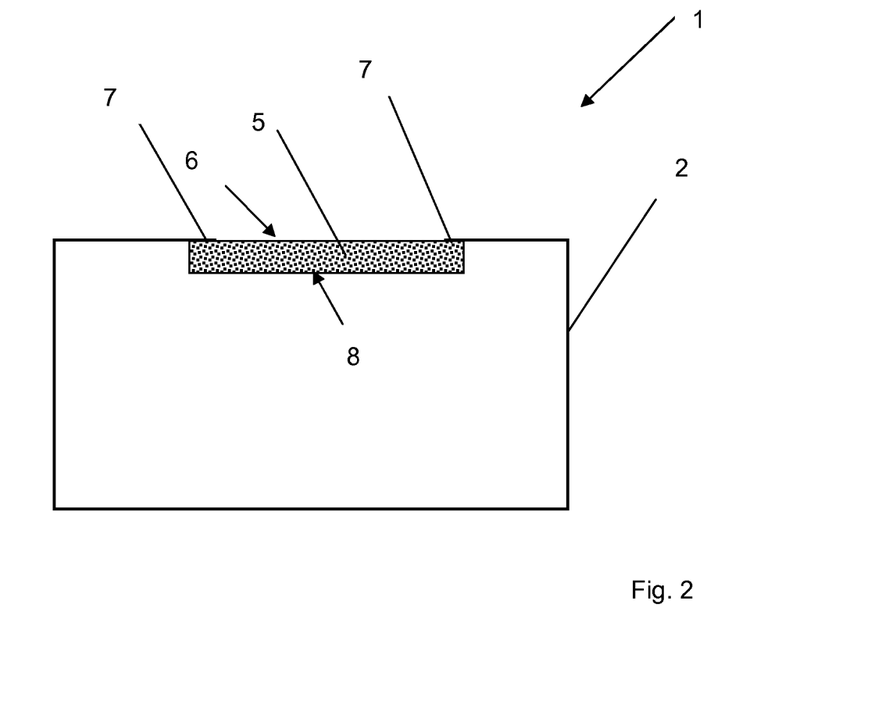
FIG. 2 shows the inventive duct.

FIG. 2 depicts a channel-body 2 of a gas duct 1. In the present case, the channel body 2 comprises a recess which is covered by a sound absorbing component 5, preferably the sound absorbing component according to FIG. 1. At the inside 8, that faces towards the inner of the channel 2, the component 5 preferably comprises a needle punched layer 3.3. At the outside 5, the component 5 may also comprise a needle punched layer 3.1. This layer 3.1 is partially over-molded by the material from which the channel-body is produced. Through the channel body 2, a gas is guided. The cannel body is preferably part of a HVAC- or battery cooling or batter charging system. The impact of sound waves can be reduced by the component 5, which is preferably gas-permeable.

Figure 3:
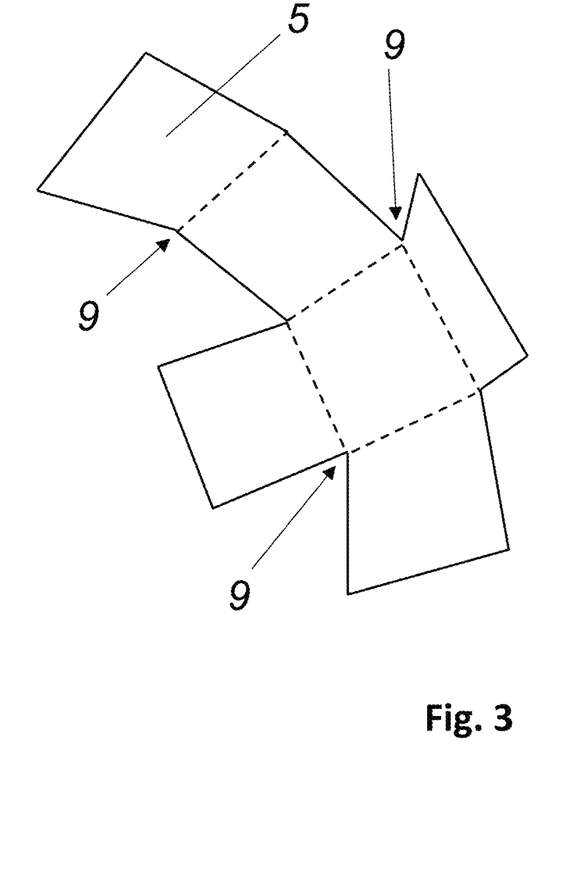
FIG. 3 shows another embodiment of the sound absorbing component.

FIG. 3 shows another embodiment of the sound absorbing component, which comprises in the present case one or more weakening area(s) 9, which are in the present case provided by compressing one or more layers 3.1-3.3 of the component 5 locally, here along one or more lines. The layers 3.3-3.3 can be bend and/or folded around these areas, which are in the present case lines to get a 3D-shaped product, here a cube. However, other geometries like ducts are also possible. The duct may have a square, rectangular or triangular cross section. The component may have the same layer configuration as described according to FIG. 1.

REFERENCE SIGNS

1 Gas duct
2 Channel body
3.1-3.3 Layer of the component 5
4 Over-mold area
5 Sound absorbing component
6 Outside of the component 5
7 Interface between channel body 2 and component 5
8 Inside of component 5
9 Weakening area, weakening line

The invention claimed is:

1. A gas-duct having a channel body manufactured from a plastic material, wherein the channel body has at least one region replaced by a sound absorbing component having an inner surface and a generally opposing outer surface, the sound absorbing component made at least partially from a non-woven air permeable or porous material made from non-woven layers including a needle punched layer and a short fiber layer, wherein fibers of the short fiber layer have an average length of about 5 mm or less, and the non-woven layers having different levels of specific air flow resistance;
   wherein a circumference of the sound absorbing component is connected to the channel body by an adhesive bond between the sound absorbing component and the plastic material of the channel body;
   wherein the adhesive bond is a connection due to over-mold of the plastic material over a portion of the inner surface and/or generally opposing outer surface, but not both, penetrating the air permeable or porous material and solidifying there, resulting in an over-mold area at the sound absorbing component.

2. The gas-duct according to claim 1, wherein the sound absorbing component is locally weakened in a weakening region and folded around the weakening region.

3. The gas-duct according to claim 1, wherein the sound absorbing component is provided in an area of the channel body where a gas flow is turbulent.

4. The gas-duct according to claim 3, wherein the sound absorbing component is provided in an area of the channel body where RE of the gas flow is greater than about 2300.

5. The gas-duct according to claim 1, wherein the sound absorbing component comprises polypropylene terephthalate (PET) and/or polypropylene (PP).

6. The gas-duct according to claim 1, wherein a non-woven layer of the sound absorbing component at an inside of the sound absorbing component or a non-woven layer of the sound absorbing component at an interface to the over-mold area is a needle punched layer.

7. The gas-duct according to claim 1, wherein the gas-duct includes two or more needle punched layers.

8. The gas-duct according to claim 1, wherein the short fiber layer consists of polypropylene and polyethylene terephthalate fibers.

9. The gas-duct according to claim 1, wherein the short fiber layer is sandwiched between two needle punched layers.

10. The gas-duct according to claim 1, wherein the needle punched layer comprises PET.

11. The gas-duct according to claim 1, wherein the short fibers are made from PET and PP.

12. The gas-duct according to claim 1, wherein the overmold is located on the portion of the inner surface.

13. The gas-duct according to claim 1, wherein the overmold is located on the portion of the generally opposing outer surface.

14. An HVAC-system comprising the gas-duct according to claim 1.

15. A battery- and/or battery-charge-system comprising the gas-duct according to claim 1.

16. A method of producing the gas-duct according to claim 1, comprising:
   providing the sound absorbing component having the inner surface and the generally opposing outer surface, the sound absorbing component made at least partially from the non-woven air permeable or porous material made from non-woven layers including the needle punched layer and the short fiber layer, wherein the fibers of the short fiber layer have an average length of about 5 mm or less, and wherein the non-woven layers have different levels of specific air flow resistance;
   placing the sound absorbing component in a die;
   overmolding the sound absorbing component around its circumference over the portion of the inner surface and/or generally opposing outer surface, but not both, by the plastic material of the channel body; and
   creating a material bond, after solidification of the plastic material, between the sound absorbing component and the plastic material of the channel body.

17. The method of claim 16, wherein the overmolding is over the portion of the inner surface.

18. The method of claim 16, wherein the overmolding is over the portion of the generally opposing outer surface.

19. A method of producing the gas-duct of claim 1, comprising:
   locally compressing and/or locally weakening the sound absorbing component to form one or more hinges;
   folding the sound absorbing component to form a sound absorbing body.

20. The method according to claim 19, wherein the sound absorbing body is placed into a mold die to overmold the channel body at least partially.

* * * * *